United States Patent [19]
Herron et al.

[11] Patent Number: 5,127,219
[45] Date of Patent: Jul. 7, 1992

[54] SAFETY CHAIN AND LATCHABLE HOOK THEREFOR

[75] Inventors: Maynard M. Herron; D. John Schroeder, both of Hesston, Kans.

[73] Assignee: Hay & Forage Industries, Hesston, Kans.

[21] Appl. No.: 609,765

[22] Filed: Dec. 14, 1990

[51] Int. Cl.⁵ .................................................. F16G 17/00
[52] U.S. Cl. ...................................... 59/93; 24/599.4; 280/505; 294/82.17
[58] Field of Search .................. 24/599.4, 599.5, 599.9, 24/600.8, 601.3; 294/82.17, 82.2, 82.33; 280/504, 505, 506, 507; 59/93

[56] References Cited

U.S. PATENT DOCUMENTS

| 639,309 | 12/1899 | Stewart | 24/599.4 |
| 1,287,825 | 12/1918 | Ballou, Jr. | 24/599.4 |
| 3,501,817 | 3/1970 | Bambenek et al. | 294/82.17 |
| 4,516,790 | 5/1985 | Hampel et al. | 280/505 |
| 4,546,523 | 10/1985 | Bailey, Jr. | 25/599.4 |

FOREIGN PATENT DOCUMENTS

| 3126066 | 1/1983 | Fed. Rep. of Germany | 24/599.4 |
| 0050291 | 11/1921 | Sweden | 24/599.4 |
| 0850547 | 8/1981 | U.S.S.R. | 294/82.17 |

Primary Examiner—David Jones
Attorney, Agent, or Firm—Hovey, Williams, Timmons & Collins

[57] ABSTRACT

A single length, wire-formed latch is pivotally attached to the hook of the chain and is so configured as to blockingly span the mouth of the chain-receiving slot of the hook when the latch is in its closed position. By grasping opposite limbs of the latch disposed on opposite sides of the hook, the latch may be pulled back against the resistive tension in the limbs to open the slot and allow the ingress and egress of the chain. One illustrated embodiment utilizes a pair of spaced mounting holes in the hook body which receive corresponding inturned, free ends of the limbs, while a second embodiment utilizes a single mounting hole in the hook body to receive one of the free ends of the limbs, the other limb having its free end extending across and bearing against an exposed, offset fulcrum surface on the exterior of the hook body to resiliently stress the limbs when the latch is pulled back into its open position.

13 Claims, 2 Drawing Sheets

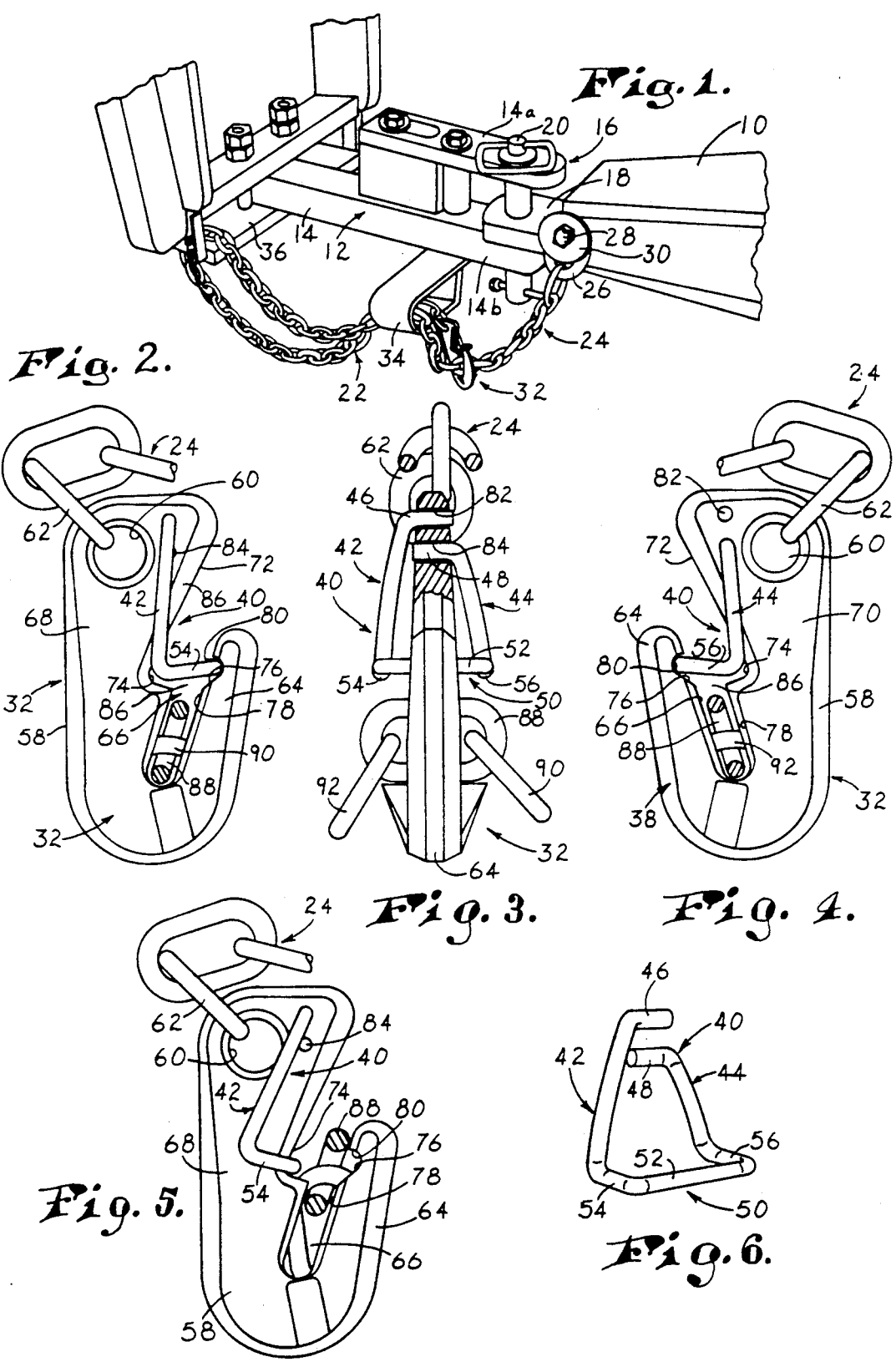

SAFETY CHAIN AND LATCHABLE HOOK THEREFOR

TECHNICAL FIELD

The present invention relates to safety chains for use with towed farm machinery and the like and, more particularly, relates to an improved, easy-to-operate latchable hook device which may be used as part of such a chain.

BACKGROUND

Farm equipment which is designed to be connected to the draw bar of a tractor is, pursuant to industry standards, provided with a factory-installed auxiliary attaching system for the purpose of retaining a connection between towing and towed machines in the event of separation of the primary attaching system. Replacement safety chains are also commonly available as aftermarket items from a variety of supply sources.

A problem with currently available safety chains is that the latches associated with the hook of such chains is difficult to use even in good conditions, while under adverse conditions it is sometimes virtually impossible to manipulate. Thus, there may be a tendency for the farmer to simply ignore using the chain, which is highly undesirable.

The hooks of such chains are typically extremely vulnerable to grit, grime, ice, dirt, and mud since the chains are most generally connected near the ground wheels of the towing vehicle and in open exposure to puddles and road materials kicked up by the vehicle. Although the latch needs to be kept clean in order to function properly, it is a time-consuming nuisance to attend to such matters and is frequently left undone. Manipulating and cleaning the latch is rendered even more difficult under adverse weather conditions when the farmer may be wearing gloves and dexterity is minimal.

Furthermore, current designs typically utilize a number of separate components which not only have a tendency to wear out and become fouled with grimy substances, but also cause excessive costs of production.

SUMMARY OF THE PRESENT INVENTION

Accordingly, one important object of the present invention is to provide a latchable hook device usable in safety chains and elsewhere which is easier to use and less susceptible to fouling than those heretofore available, yet does not sacrifice strength or the ability to prevent inadvertent release.

Another important object of the present invention is to provide a latchable hook device which can be produced and assembled at lower costs than those currently available without sacrificing performance or safety.

A further important object of the present invention is to provide an improved safety chain assembly which is quick and easy to couple and uncouple manually yet which retains the inherent strength and safety desired for equipment of this type.

Yet another important object of the present invention is to provide a latchable hook device for a safety chain which promotes adherence to good safety practices by encouraging its use through simplistic design.

In carrying out these and other objects of the present invention, it is contemplated that the latch associated with the hook of the safety chain will be constructed from a single length of sturdy, formed wire which is bent and formed in such a manner as to be installed with an inherent measure of spring-loading so that the latch biases itself toward a closed position precluding inadvertent separation of the chain from the hook. The body of the chain is constructed from interconnected lengths of material, each of which is a continuous, rigid loop, so that adjacent links in the chains are mutually interconnected at right angles to one another. Thus, when the chain is in use with the hook doubled back onto the chain, a selected link is slipped down into a receiving slot of the hook where it is captured by the wire latch blocking its escape from the slot. Endwise movement of the chain in either direction is prevented since next adjacent links in the chain are turned with their wide dimensions transverse to the slot.

Two different forms of the latch are contemplated, one of which requires the hook to be prepared with a pair of mounting holes for opposite ends of the wire latch and the other of which requires only a single mounting hole. The double hole version has a pair of limbs which extend along opposite sides of the shank of the hook and are interconnected at an acute angle by a bight portion which spans the slot in covering relationship thereto when the latch is in its closed position. Because the two mounting holes for the opposite ends of the latch are in laterally offset relationship to one another, the limbs are provided with an inherent restoring force which biases the latch toward its closed position, yet allows the same to be opened by grasping the limbs and pulling the latch rearwardly away from the slot as the bight straddles the shank of the hook. The second form utilizing a single mounting hole likewise has a pair of limbs on opposite sides of the shank of the hook and a bight portion which interconnects the limbs at acute angles in bridging relationship to the slot, but the free end of the one limb extends across an exposed front edge of the shank rather than passing through a mounting hole. The point of contact of the free end of the limb is offset from the mounting hole of the other end so as to provide a preloaded restoring force to the latch which increases as the latch is manually pulled away from the slot to open the same. An extended tail portion on the free end of the second latch provides a convenient operating lever for such version.

BRIEF DESCRIPTION OF THE DRAWINGS

FIG. 1 is a fragmentary perspective view of a typical primary attaching system between towing and towed machines showing a safety chain in accordance with the principles of the present invention used as an auxiliary attaching system;

FIG. 2 is an enlarged elevational view of one side of the hook of such chain illustrating the latch in its closed position and the chain broken away and shown in cross section to illustrate relationships between the various components involved;

FIG. 3 is a front elevational view of the hook of FIG. 2 with the chain once again fragmentarily shown and portions of the upper end of the shank of the hook broken away and shown in cross section to reveal details of construction;

FIG. 4 is a side elevational view of the opposite side of the hook from that illustrated in FIG. 2, again showing the latch in its closed position and the chain shown fragmentarily and in cross section to reveal relationships of the components;

FIG. 5 is a side elevational view of the hook similar to FIG. 2 but with the latch retracted into its open position to allow release of the chain from the receiving slot;

FIG. 6 is a right front perspective view of the latch associated with the hook of FIGS. 1-5;

DETAILED DESCRIPTION

Figure 7:
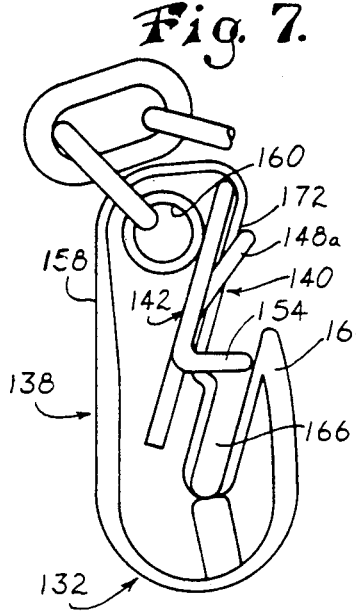
FIG. 7 illustrates a second embodiment of the invention and shows a slightly modified hook in side elevation with a modified latch which requires only a single mounting hole in the hook.
Figure 8:
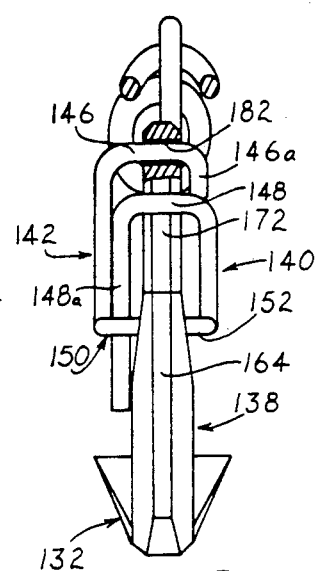
FIG. 8 is a front elevational view of the hook and latch arrangement of FIG. 7.
Figure 9:
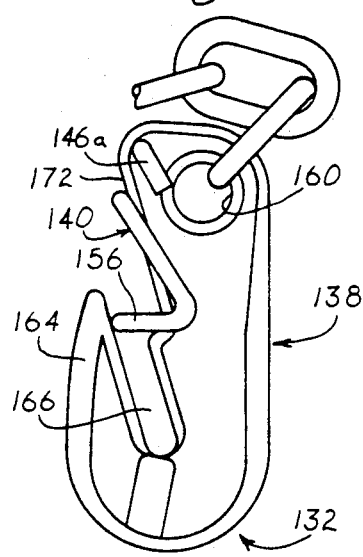
FIG. 9 is a view of the hook and latch taken from the opposite side of that illustrated in FIG. 7.
Figure 10:
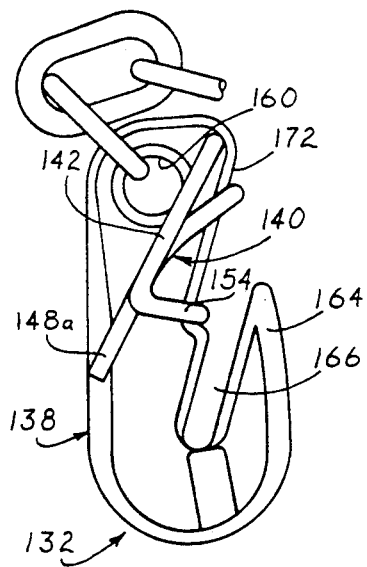
FIG. 10 is a side elevational view of the hook and latch embodiment similar to FIG. 7, but showing the latch retracted into its open position.

It will be appreciated that the latchable hook device of the present invention may be utilized in a variety of assemblies for a variety of uses. For purposes of illustrating the principles of the present invention, and because the hook device does have particular utility in a safety chain assembly, the hook device has been illustrated and will hereinafter be described in connection with a safety chain assembly.

FIG. 1 shows the tongue 10 of a towed machine (not illustrated) coupled with a towing vehicle through the primary attaching system 12 of the equipment. For purposes of illustration, such primary system has been shown as including a fore-and-aft extending draw bar 14 which defines a clevis 16 at its rear end by virtue of upper and lower, vertically spaced furcations 14a and 14b. The forwardly projecting lug 18 of tongue 10 fits between the furcations 14a and 14b in vertical registration with holes therein so as to removably receive a latch pin 20 as is commonly known.

A safety chain assembly 22 providing an auxiliary connection or attachment between the two pieces of machinery incorporates the principles of the present invention. Chain assembly 22 includes a link chain 24 constructed from a series of rigid loops or links that are interconnected with one another at mutual right angles. At one end of the chain 24, a rigid loop 26 is fastened to the tongue 10 via a bolt 28 and large washer 30, while at the other end of the chain 24 a self-latching hook device 32 is provided to retainingly capture the chain 24 when the chain is doubled back onto itself and the hook is applied thereto. As illustrated in FIG. 1, one typical manner of using the assembly 22 is to run the chain 24 from its anchor point at bolt 28 to and through a secondary support 34 on the draw bar 14, then around a horizontal structural member 36 on the forward machine, thence back through the support 34 and onto the original length of the chain 24.

The hook device 32 has two major components, i.e., a generally J-shaped hook 38 and a self-closing latch 40. Dealing first with the latch 40, and with particular reference to FIG. 6, it will be seen that the latch 40 is constructed from a single length of wire stock formed into a particular configuration somewhat resembling a wire bail. The latch 40 includes a pair of elongated limbs 42 and 44 that are spared apart laterally and which converge as their upper ends are approached. The limb 42 is slightly longer than the limb 44 and has an inturned, transverse extension 46 at its upper end that extends in parallel relationship to an oppositely inturned, transverse extension 48 at the upper end of the limb 44. The extension 48 is laterally offset from the extension 46 a short distance below the latter.

The limbs 42 and 44 flare out progressively from one another as their lower ends are approached until joining with a generally U-shaped bight 50 that integrally interconnects the lower ends of the limbs 42 and 44 with one another. Bight 50 lies in a plane having an included angle with the plane generally occupied by the limbs 42, 44 of less than 90' so as to render the latch 40 generally L-shaped when viewed in side elevation from one side thereof. The bight 50 includes a transverse crossbar 52 and a pair of opposite legs 54 and 56 which extend transversely from the crossbar 52 and integrally join the respective limbs 42, 44 at their lower ends.

The J-shaped body of hook 38 is adapted to be constructed by a forging process. A shank portion 58 of the hook body has a relatively large opening 60 formed therein at its upper end for the purpose of swingably yet permanently attaching the hook 38 to the endmost link 62 of the chain 24. At its lower end the shank 58 curves outwardly and upwardly so as to integrally join with an upwardly and outwardly projecting tooth 64 which is somewhat longer than one-half the length of the shank 58. The tooth 64 and the shank 58 are separated by an elongated, upwardly and forwardly extending slot 66 which forms the crotch of the hook 38.

The body of the hook 38 has two opposite flat sides 68 and 70, the sides 68,70 converging toward one another in a slight manner as the upper end of the shank 58 is approached, as illustrated perhaps most clearly in FIG. 3. A front edge 72 of the shank 58 extends downwardly and inwardly until reaching the slot 66 where it continues toward the lower portion of the hook body to define the rear extremity of the slot 66. The front edge 72 slopes inwardly at a more severe angle in the area above the slot 66 than within the latter so as to define a recess 74 that is disposed horizontally across from a notch 76 in the inwardly facing edge 78 of the tooth 64, such notch 76 serving to define an overhang 80 to captively retain the crossbar 52 of the latch 40 when the latter is installed on the hook 38 and is in the closed position, as will hereinafter be discussed in more detail.

At the upper end of the shank 58, a pair of vertically spaced, transversely extending holes 82 and 84 are provided for attaching the latch 40 to the hook 38. The distance between the holes 82 and 84 corresponds to the distance between the extensions 46 and 48 of limbs 42 and 44.

The extensions 46 and 48 overlap one another transversely of the latch 40, as best illustrated in FIGS. 3 and 6. Thus, in order to install the latch 40 upon the hook 38, the limbs 42 and 44 are spread apart transversely while the latch 40 is forced onto the shank 58 over the front edge 72. A double chamfer 86 on the front edge 72 and circumscribing the rest of the hook body helps spread the limbs 42 and 44 as they are pushed rearwardly onto the upper end of the shank 58 over the edge 72. Upon reaching the transverse holes 82 and 84, the aligned limb extensions 46 and 48 snap into the holes and cause the latch 40 to become swingably attached to the hook 38.

As a result of the lateral offset between the limb extensions 46 and 48, the two limbs 42 and 44 are adapted to pivot about different axes, i.e., the axes through the respective limb extensions 46 and 48. Consequently, when the latch 40 is swung rearwardly to its position in FIG. 5, for example, the limbs 42 and 44 will be stressed to induce a restoring force tending to swing the latch 40 back toward the right, i.e., toward its original position.

Moreover, by initially forming the latch 40 in such a manner that the limb 44 is disposed forwardly out of the plane of the limb 42 in the natural state, a built-in restoring force can be created so that when the limb 44 is inserted into the hole 84 directly below the hole 82, it seeks to return to its natural position, causing the latch 40 to be biased toward its FIG. 2 position which closes off the top of the slot 66. When the latch 40 is in its closed position of FIG. 2, the crossbar 52 of the latch 40 is rested within the notch 76 and below the overhang 80, when latch 40 is in the open position of FIG. 5, the two legs 54 and 56 of the latch 40 straddle the shark 58 and the crossbar 52 is disposed on top of the step within the recess 74 to uncover and avoid obstructing the slot 66.

Preferably, the latch 40 is constructed from 3/16" diameter A227 cold-drawn spring wire and may be conveniently formed into the desired configuration on conventional wire forming machinery. The hook 38 is preferably forged and the opening 60 is hot punched through the shank 58. If possible, it is desired that the holes 82 and 84 likewise be hot punched through the shank 58, although a more accurate drilling operation may be necessary in order to hold the desired degree of accuracy in locating the centers of holes 82 and 84. It is preferred that the latch 40 be preloaded with a restoring force of such magnitude that approximately 10 to 15 pounds of force is necessarily to be applied to the latch 40 in order to swing the same from its closed position of FIG. 2 toward its open position of FIG. 5.

OPERATION

In use, the safety chain assembly 22 is most suited to be utilized as illustrated in FIG. 1 in which the chain 24 is doubled back onto itself and one of the chain links is inserted edgewise into the slot 66 through the entry mouth 86 defined at the outermost end of the slot 66. As illustrated best in FIGS. 2, 3, and 4, it will be seen that when a selected link, such as the link 88, is received into the slot 66, the next adjacent links 90 and 92 respectively cannot be pulled through the slot 66 in a transverse direction, inasmuch as links 90 and 92 are disposed at essentially right angles to the edgewise positioned link 88. Consequently, the chain 24 cannot be lengthened or shortened due to pulling forces along the length thereof and is only removable from the hook 38 back through the mouth 86 of the slot 66, which is of course closed by the latch 40. When the latch 40 is in its closed position, the bight 50 functions as a blocking portion of the latch and prevents escape of the chain.

As a result of the unique configuration of the latch 40, the user can readily grasp the two opposite limbs 42 and 44 between his thumb and forefinger and pull the latch 40 back into its open position of FIG. 5 to uncover the mouth 86 of slot 66 and allow the chain 24 to slip from the hook 38. Releasing the latch 40 then causes the same to return to its normal closed position covering the mouth 86.

The same sort of gripping and retracting of the latch 40 by the user is carried out when the hook 38 is to be latched onto the chain 24. In this respect, it will be seen that with the limbs 42,44 grasped and pulled rearwardly to the open position as in FIG. 5, the selected chain link 88 may be slipped into the slot 66 edgewise of the link, whereupon release of the limbs 42,44 causes the latch 40 to snap back to its closed position of FIG. 2 with the crossbar 52 seated firmly beneath the overhang 80. As a result of the overhang 80, the bight 50 is able to more strongly resist upward bending under heavy loading which might be applied by the chain link 88. Consequently, inadvertent escape of the chain 24 from the hook 24 is resisted to a greater extent than would otherwise be the case.

Furthermore, it will be appreciated that the geometrical relationship between the slot 66 and the bight 50 when latch 40 is closed is such that upwardly directed forces by the chain against bight 50 have resultant vectors tending to push latch 40 closed, rather than open. In this respect it will be noted that the slot 66 slopes upwardly and outwardly along a line falling in front of the pivot axes of the latch 40 defined by holes 82 and 84.

It will be apparent that the foregoing construction of the hook 38 and its cooperating latch 40 provides a significant improvement in the relevant art. The latch 40 is easy to use and yet safely and securely holds the chain 24 in place within the slot 66. Even if the user is wearing heavy gloves during adverse weather conditions, the limbs 42 and 44 are readily accessible for manipulating the latch 40 between its open and closed positions, particularly in view of the outward spacing of the limbs 42,44 from the opposite sides 68,70 of the hook 38 and the convenient outward and downward flaring configuration presented by the specially configured latch 40.

The open loop configuration of the latch 40 also makes it relatively simple to keep the latch 40 free of debris and fouling materials, such as grit, grime and ice, all of which not only promotes reliable operation but also encourages the farmer or other user to utilize the safety chain assembly 22 in his towing operations.

ALTERNATIVE EMBODIMENT

FIGS. 7-11 illustrate a second embodiment of the present invention which is similar to the first embodiment hereinabove described, yet different in certain specific respects. The differences reside primarily in the configuration of the latch and the fact that the embodiment of FIGS. 7-10 has its latch employing only a single mounting hole on the hook, whereas the first embodiment employs a pair of such mounting holes.

Figure 11:
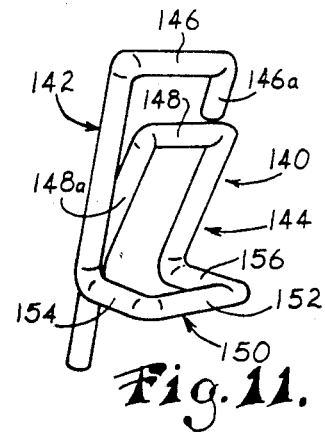
FIG. 11 is a right front perspective view of the latch as utilized with the hook in FIGS. 7-10.

In particular, it will be seen that the hook device 132 of the second embodiment employs a hook 138 and a self-closing, spring-loaded latch 140. As with the latch 40, the latch 140 is constructed from a single length of wire stock, preferably having a configuration that permits it to be formed on conventional wire forming machinery. With reference to FIG. 11, it will be seen that the latch 140 includes a pair of elongated, laterally spaced apart limbs 142 and 144 provided at their upper ends with oppositely inturned extensions 146 and 148, respectively. Unlike the first embodiment, the limb extension 146 also includes a downturned terminus 146a that helps retain the latch 140 in its mounting hole within the hook 138, as will be apparent. Also, unlike the first embodiment, the oppositely inturned limb extension 148 includes its own downturned tail 148a which extends generally downwardly alongside of the limb 142 inboard of the latter and projects a distance beyond the lower extent of the limb 42 to function conveniently in the nature of an operating lever, as will be seen. The tail 148a may be slightly bent as illustrated.

The limbs 142 and 144 are interconnected at their lower ends by a bight 150 having a transverse crossbar 152 and a pair of side legs 154 and 156 integrally joining the bight 152 with the lower ends of the limbs 142 and 144 respectively. The bight 150 is disposed at an acute angle to the generally upright plane of the limb 142 and its extensions 146,146a, and is disposed at an even more acute angle to the plane of the limb 144 and its extension 148 and tail 148a inasmuch as limb 144 is leaned slightly forwardly out of the plane of the limb 142 when the latch 140 is in its natural, unstressed condition, as illustrated in FIG. 11.

The hook 138 may be substantially identical to the hook 38 with the exception of providing only a single mounting hole for the latch 140 instead of a pair of such holes, as in the first embodiment. In this respect, it will be seen, particularly viewing FIG. 8, that a single transversely extending mounting hole 182 is provided in the upper end of the shank 158 of the hook 138 which pivotally receives the extension 146 of limb 142. The downturned terminus 146a on the side 170 of the hook 138 retains the extension 146 against retrograde longitudinal movement out of the mounting hole 182.

As earlier mentioned, the limb 144, its extension 148 and its tail 148a, are deformed forwardly out of the plane of the limb 142. Thus, when the latch 140 is installed on the hook 138, the extension 148 lies across and bears against the front edge 172 of the hook body. By having the fore-and-aft distance between the limb extensions 146 and 148 less when the latch 140 is in its natural state than when installed on the hook and in its closed position, a preloading of the latch 140 will be created which inherently biases the latch 140 toward the closed position of FIG. 7. The extent of such preloading depends upon the extent to which the limbs 142 and 144 are disposed in the same plane when the latch 140 is in its natural state and the distance between the limb extensions 146,148 when latch 140 is installed on the hook 138 and is in its closed position of FIG. 7.

It will be appreciated that engagement of the limb extension 148 with the front edge 172 of the hook body is similar in many respects to the engagement which occurs between the limb extension 48 of latch 40 and the walls of the mounting hole 84. In the case of the latch 140, such front edge 172 serves as an anchor point and somewhat as a fulcrum as the latch 140 is gripped and pulled rearwardly from its closed position of FIG. 7 to its open position of FIG. 10, stressing the limbs 142,144 and storing up energy to return the latch 140 to its closed position when the limbs 142 and 144 are thereafter released. In the case of the limb extension 48, of course, the hole 84 retains and anchors the upper end of the limb 44 so that the two limbs 42 and 44 are stressed progressively further and further out of a common plane as the latch 40 is pulled rearwardly to its open position of FIG. 5, storing up energy to return the latch 40 to its closed position when the limbs 42 and 44 are thereafter released.

While in the second embodiment of FIGS. 7-11 the latch 140 may be grasped by its two limbs 142 and 144 during manipulation, it may also be convenient to operate the latch 140 utilizing only the extended tail 148a. Operating latch 140 via the tail 148a permits the user to utilize his thumb alone in engagement with the latch.

As with the first embodiment, it will be recognized that the latch 140 provides a safe and secure means of entrapping the chain within the slot 166 of the hook 138 during use. Although no overhanging projection has been illustrated in the tooth 164 of the hook 138, it will be appreciated that, like the first embodiment, the embodiment of FIGS. 7-11 could be provided with such overhang. While that type of construction is preferred, it is not absolutely required.

In the preferred form of the embodiment of FIGS. 7-11 the hook 138 is forged and the mounting hole 182 is hot punched, as is the opening 160 for chain attachment. The latch 140 is preferably constructed from 3/16" diameter A227 cold-drawn spring wire.

Although preferred forms of the invention have been described above, it is to be recognized that such disclosure is by way of illustration only, and should not be utilized in a limiting sense in interpret the scope of the present invention. Obvious modifications to the exemplary embodiments, as hereinabove set forth, could be readily made by those skilled in the art without departing from the spirit of the present invention.

I claim:

1. In a safety chain assembly that includes a chain provided with a series of interconnected links and a hook at one end of the chain, said hook having a slot for receiving a selected link of he chain when the chain is formed into a loop and the hook is slipped transversely onto the chain, the improvement comprising:

a single-piece, generally L-shaped, formed wire latch pivotally coupled to said hook and configured to present a blocking portion which blocks the slot when the latch is in a closed position and which unblocks the slot when the latch is swung to an open position, said latch including means integral therewith for yieldably biasing the latch into its closed position, said hook having a transverse hole therein, said latch being formed to present a pair of limbs extending along opposite sides of the hook generally in the longitudinal direction of the slot in the hook, one of said limbs having an inturned extension pivotally received within said hole to adapt the latch for swinging movement between said open and closed positions, the other of said limbs having an oppositely inturned extension engaging a restraining surface on the hook which is laterally offset from the hole to present said yieldable biasing means, the offset relationship between said hole and said restraining surface causing increased biasing force within the latch as the latch is pivoted toward said open position from said closed position, said limbs having a generally U-shaped bight integrally interconnecting the same remote from said inturned extensions, said bight being disposed at an angle to said limbs and projecting transversely therefrom for spanning the slot when the latch is in its closed position thereby forming said blocking portion of the latch, said bight having a pair of opposite legs which are moved out of blocking relationship with the slot and into straddling relationship with the opposite sides of the hook when the latch is pivoted to its open position.

2. In a safety chain assembly as claimed in claim 1, said restraining surface comprising the interior annular surface of a second transverse hole in the hook laterally offset from the first-mentioned hole, said oppositely inturned extension of the other of said limbs projecting into and being captively received by said second transverse hole.

3. In a safety chain assembly as claimed in claim 1, said bight including a transverse cross bar integral with said legs of the bight, said hook having a pair of opposed surfaces on opposite fore-and-aft sides of the slot with respect to the direction of pivotal movement of the latch, the surface on the forward side of the slot having an overhanging shoulder for captively overlying the cross bar of the bight when the latch is in its closed position.

4. In a safety chain assembly as claimed in claim 1, said restraining surface comprising an external surface of the hook adjacent the latch as the latch pivots toward its closed position, said oppositely inturned extension of the other of said limbs bearing against said external surface at a point in laterally offset relation to said hole.

5. In a safety chain assembly as claimed in claim 4, said inturned biasing extension of said other limb having a downward further extension extending along the same side of the hook as said one limb.

6. In a safety chain assembly as claimed in claim 5, said further extension lying between said one limb and the corresponding side of the hook.

7. A latchable hook device for use with a chain which has a series of interconnected links, said latchable hook device including:

a generally J-shaped hook having an elongated shank provided at one end with an opening for coupling the hook with the chain and provided at the other end with an integrally joined, upturned tooth, said tooth projecting upwardly along a front side of the shank in spaced relation therewith to define a chain-receiving slot having an entry mouth; and a spring-loaded, generally L-shaped, releasable latch attached to said shank and yieldably biased into a closed position against said tooth for spanning said slot adjacent the mouth thereof and for preventing escape of the chain from the slot, said latch being constructed from a single length of wire formed to present a pair of elongated, resilient, laterally spaced apart limbs that are interconnected by a generally U-shaped bight which is disposed at an angle to said limbs and projects transversely therefrom for extending across the slot to close off the same when the latch is in said closed position, said latch being mounted on the hook with said limbs disposed on opposite sides of the hook with said limbs disposed on opposite sides of the hook and the bight straddling the shank adjacent the mouth of the slot, said shank having a transverse mounting hole in said one end thereof rotatably receiving an inturned extension of one of said limbs remote from said bight to adapt the latch for swinging movement between said closed position and an open position in which the limbs and the bight are swung back onto the shank uncovering the mouth of the slot, said shank further having a surface engaging an oppositely inturned extension of the other of said limbs at a location laterally offset from said mounting hole in a direction causing the latch to be preloaded with a restoring force tending to maintain the same in its closed position.

8. A latchable hook device as claimed in claim 7, said surface which engages the oppositely inturned extension of the other limb comprising the internal wall of a second transverse hole through the shank adjacent the first-mentioned hole but in, laterally spaced relationship thereto.

9. A latchable hook device as claimed in claim 8, said limbs diverging outwardly from one another as said bight of the latch is approached.

10. A latchable hook device as claimed in claim 8, said bight of the latch including a transverse cross bar, said tooth of the hook including an overhanging shoulder adjacent the mouth of the slot for captively overlying said cross bar when the latch is in its closed position.

11. A latchable hook device as claimed in claim 10, said shank having an external edge facing the slot, said surface which engages the oppositely inturned extension of the other limb comprising said external edge.

12. A latchable hook device as claimed in claim 11, said oppositely inturned extension of the other limb having a downturned extension extending along the same side of the shank as said one limb of the latch and projecting beyond said bight to facilitate manipulation of the latch.

13. A latchable hook device as claimed in claim 12, said further extension lying between said one limb and the corresponding side of the shank.

* * * * *